UNITED STATES PATENT OFFICE.

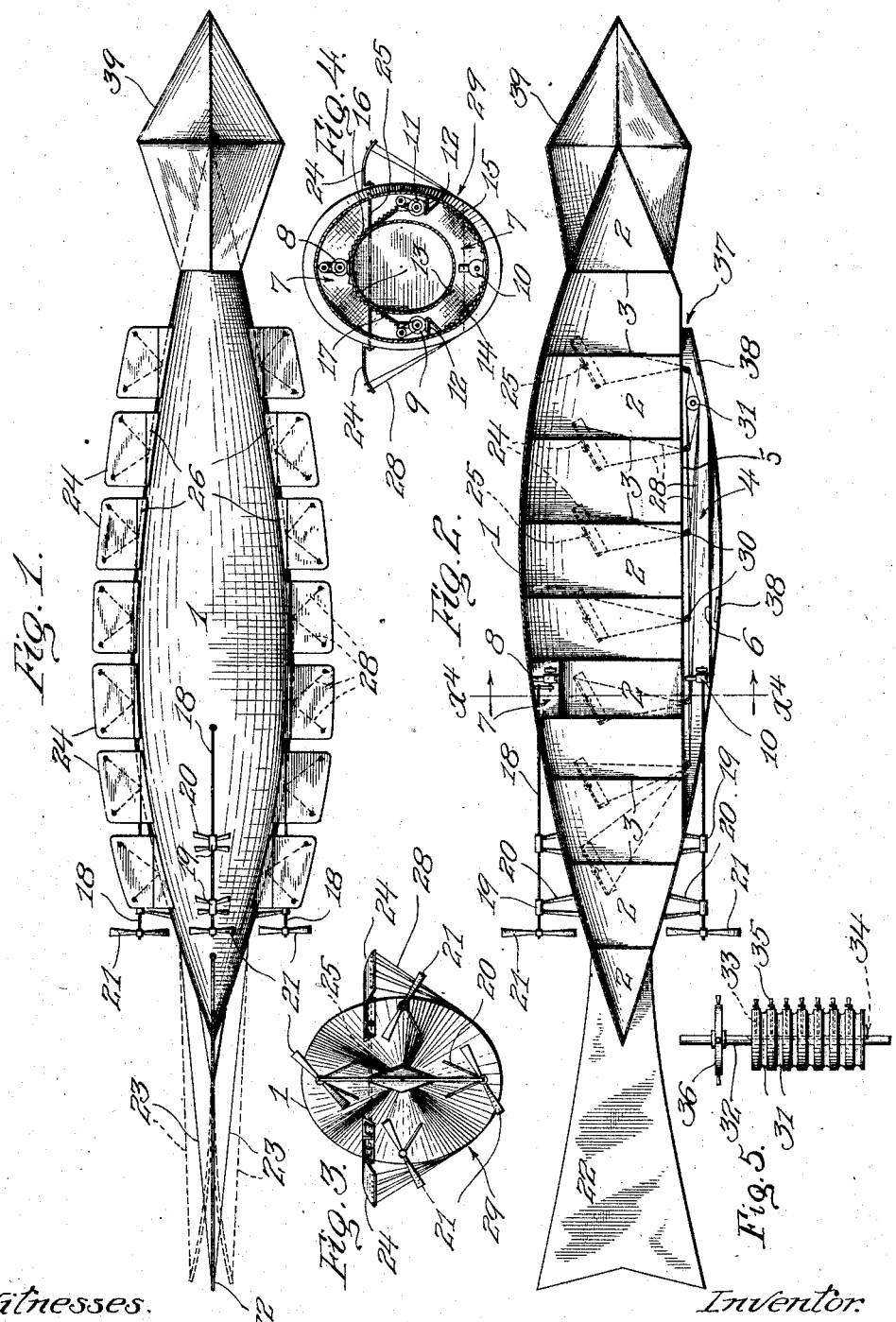

RICHARD P. MARABLE, OF YUMA, ARIZONA TERRITORY.

AERIAL NAVIGATION.

970,842.  Specification of Letters Patent.  Patented Sept. 20, 1910.

Application filed August 30, 1909.  Serial No. 515,331.

*To all whom it may concern:*

Be it known that I, RICHARD P. MARABLE, a citizen of the United States, residing at Yuma, in the county of Yuma and Territory of Arizona, have invented new and useful Improvements in Aerial Navigation, of which the following is a specification.

This invention relates to improvements in aerial navigation and particularly to that type of air ship known as "lighter than air machines", wherein a balloon is employed for suspending the ship, and the main objects of the present invention are to provide a series of aerial-plane devices which will assist in sustaining the ship and thereby permit a smaller balloon to be employed.

A further object is to provide a rigid shell for housing the gas.

A further object is to employ a plurality of independent motors and propellers co-operating therewith, so that in the event of failure of a propeller or its engine, the others may continue in operation.

Referring to the drawings: Figure 1 is a plan view. Fig. 2 is a longitudinal vertical section through the invention. Fig. 3 is a rear elevation. Fig. 4 is a section on line $x^4$—$x^4$ Fig. 2. Fig. 5 is a plan view of the device for controlling the inclination of the aerial-planes.

1 designates the shell of the ship which is preferably constructed of aluminum for the sake of lightness and rigidity. The shell 1 is divided into a series of compartments 2 by vertical bulkheads 3, preferably also of aluminum, and the chambers 2 containing the gas. Obviously, should the casing 1 become punctured or damaged in such a way as to leak, the entire contents of gas would not escape, but only that portion which was contained within the chamber 2 where the leak occurred. The interior of the casing 1 is also formed with a storage space or cabin 4 by a longitudinal partition 5 with which the bottoms of the bulkheads 2 unite. A deck 6 provides a level floor space for the chamber 4. Located a short distance aft from the mid-ship is an annular engine room 7 containing four engines 8, 9, 10 and 11, the engines 9 and 11 being located on platforms 12 at points diametrically opposite each other, the engine 10 being located in the bottom of the engine chamber 7, the engine 8 being located at the top of the engine chamber 7 and resting upon the circular wall 13 which forms the engine chamber 7.

In order to make the engines accessible four stairways are employed, stairway 14 extending from engine 10 to engine 9 and being built on the outer casing; stairway 15 extending from engine 10 to engine 11 and also being on the outer casing; stairway 16 extending from engine 11 to engine 8 and being mounted on the inner wall 13; stairway 17 extending from engine 9 to engine 8 and being mounted on the inner wall 13. From the respective engines propeller shafts 18 extend aft through the shell 1 and are supported externally by bearings 19 mounted on brackets 20. Propellers 21 are carried by the respective propeller shafts. A rudder 22 is rigidly secured to the stern of the casing 1. Two ropes 23 are connected to the rear edge of the rudder and extend through the shell 1, so that by pulling either rope 23 the rudder may be flexed as indicated by dotted lines in Fig. 1 to thereby guide the course of the craft.

Along each side of the casing 1 is a series of adjustable aerial-planes 24 which are supported by shafts 25. Between each aerial-plane 24 and the shell 1 is a shelf 26 which acts somewhat as a continuation of the aerial-plane to fill the space between the aerial-plane 24 and the shell. The opposite ends of each aerial-plane are connected to ropes 28 which extend through holes 29 in the casing 1 and thence over pulleys 30 to a series of sheaves 31, each sheave 31 being loosely mounted on a shaft 32 and having a sliding bolt 33 which is adapted to engage in a groove 34 in the shaft 32. Each bolt 33 has a handle 35, by means of which the bolt may be released from the groove 34 and then the handle 35 operated to turn the sheave 31 and thereby adjust the associated aerial-plane 24 to the angle desired. In this manner the aerial-planes may be independently adjusted so that it is an easy matter to trim the ship; for example, if a large number of passengers go forward the forward aerial-planes will be adjusted at an inclination so that their forward edges will be higher than their rear edges, which will give the forward end of the sheave an upward tendency which will counteract the extra weight. Similarly, should the passengers move aft in amount sufficient to cause the stern to sag, the after aerial-planes may be adjusted at an inclination with their forward ends uppermost, which will neutralize the weight in the stern. By locking all of the sheaves 31 with the shaft 32, they may be operated simultaneously by means of the hand wheel 36 which is provided on the shaft 32. When the aerial-planes are adjusted, as indicated in Fig. 2, they give the ship an upward movement as the ship moves forward, which is auxiliary to the lifting power of the gas. Likewise, if it be desired to descend, the aerial-planes may be adjusted in opposite inclinations.

In the forward end of the cabin 4 is an opening 37 through which observation may be had. The lower part of the shell is also provided with manholes 38 giving access thereto. At the forward end a spear-shaped frame 39 is provided for use as a ram in warfare, by means of which gas bags of opposing balloons may be punctured or other form of aerial craft may be damaged.

Each aerial-plane 24 extends outwardly and downwardly from a shelf 26 so that the under face of each aerial-plane is concave and thereby gives a parachute effect to the aerial-planes.

What I claim is:

1. A gas holder comprising an aluminum cigar-shaped body divided into a series of separate gas compartments by bulkheads, propellers for the body arranged in the same vertical plane at different points around said body, steering means, an annular engine chamber formed within said body externally of one of the gas chambers and a plurality of engines in said annular chamber, each of said engines being connected to one of said propellers.

2. A gas holder comprising an aluminum cigar-shaped body divided into a series of separate gas compartments by bulkheads, propellers for the body, steering means, an annular engine chamber formed within said body externally of one of the gas compartments, an engine located at the bottom of said annular engine chamber, another engine at the top of said annular engine chamber, and two engines at points between the first engines, each of said engines being connected to one of said propellers.

3. A gas holder comprising a light, metallic, cigar-shaped body, propellers therefor, steering means, a plurality of adjustable aerial-planes extending longitudinally on each side of the body, each aerial-plane comprising a shelf attached to the body, and a curved plate extending outwardly and downwardly from said shelf.

4. A gas holder comprising a light, metallic, cigar-shaped body, propellers therefor, steering means, a plurality of adjustable aerial-planes extending longitudinally on each side of the body, each aerial-plane comprising a plate, a shelf between the plate and body, and means for independently adjusting said aerial-planes.

5. A gas holder comprising a light, metallic, cigar-shaped body, propellers therefor, steering means, a plurality of adjustable aerial-planes extending longitudinally on each side of the body, means for independently adjusting said aerial-planes, each aerial-plane comprising a plate, a shaft supporting the plate, a shelf between the plate and body, two ropes extending from opposite edges of each plate through a hole in the body, and means for independently or simultaneously operating said ropes.

6. A gas holder comprising a light, metallic, cigar-shaped body, propellers therefor, steering means, a plurality of adjustable aerial-planes extending longitudinally on each side of the body, means for independently adjusting said aerial-planes, each aerial-plane comprising a plate, a shaft supporting the plate, a shelf between the plate and body, two ropes extending from opposite edges of each plate through a hole in the body, the lower portion of the body being provided with a cabin, a shaft therein, a series of sheaves on the shaft, each of said ropes being wound around one of said sheaves, and means for detachably locking each sheave with the shaft.

7. A gas holder comprising a light, metallic, cigar-shaped body, propellers therefor, steering means, a plurality of adjustable aerial-planes extending longitudinally on each side of the body, means for independently adjusting said aerial-planes, each aerial-plane comprising a plate, a shaft supporting the plate, a shelf between the plate and body, two ropes extending from opposite edges of each plate through a hole in the body, the lower portion of the body being provided with a cabin, a shaft therein, a series of sheaves on the shaft, each of said ropes being wound around one of said sheaves, said shaft having a recess, and a sliding bolt in each sheave adapted to engage in said recess, and a hand wheel for operating said shaft.

8. A gas holder comprising a light, metallic, cigar-shaped body, propellers therefor, steering means, a plurality of aerial-planes extending longitudinally on each side of the body, each aerial-plane comprising a plate having a concave under face, a shaft supporting the plate, a shelf between the plate and body, and means for independently or simultaneously operating said plates.

In testimony whereof, I have hereunto set my hand at Los Angeles, California, this 21st day of August, 1909.

RICHARD P. MARABLE.

In presence of—
  G. T. HACKLEY,
  FRANK L. A. GRAHAM.